Patented July 25, 1950

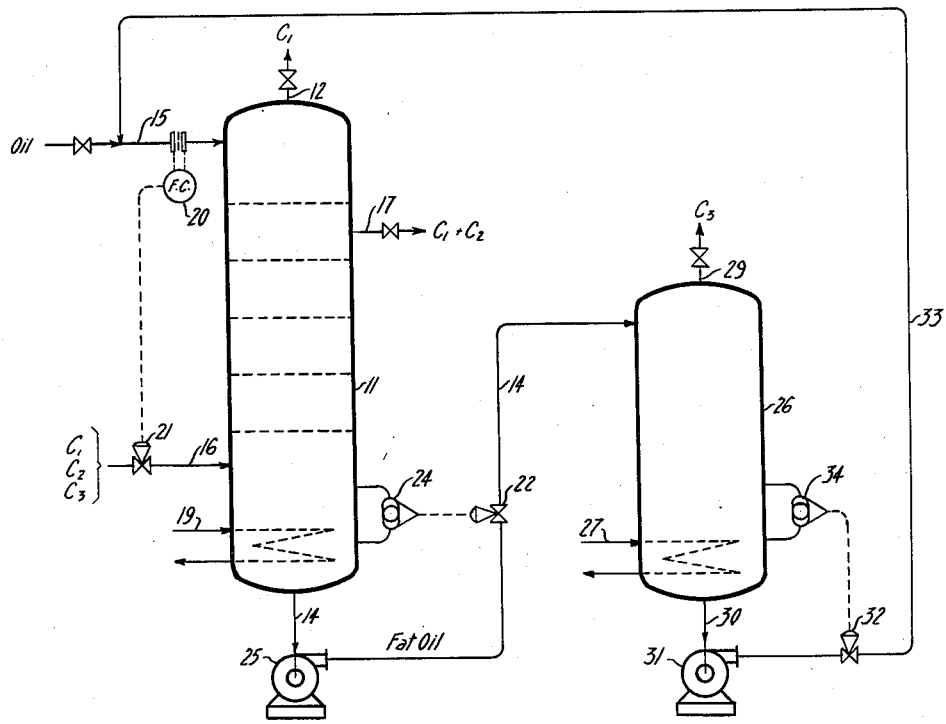
Fig. I
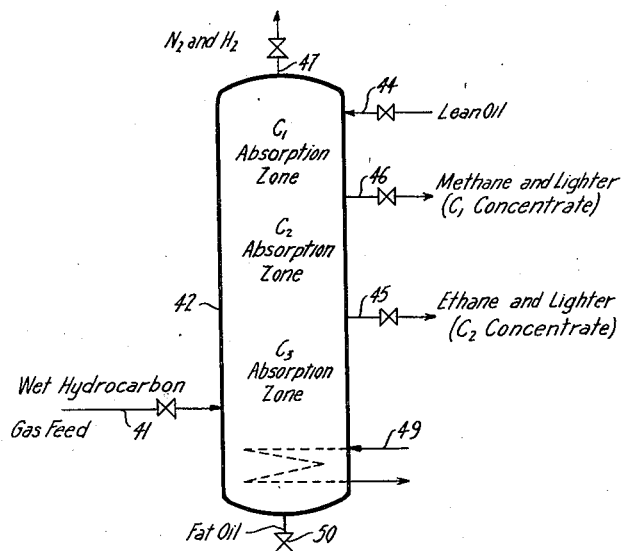
Fig. II
Inventor: Philip H. Deming
By His Agent

2,516,507

UNITED STATES PATENT OFFICE 2,516,507

ABSORPTION SEPARATION PROCESS FOR HYDROCARBONS

Philip H. Deming, San Francisco, Calif., assignor to Shell Development Company, San Francisco, Calif., a corporation of Delaware Application March 29, 1947, Serial No. 738,177

9 Claims. (Cl. 183—115)

This invention relates to a process for the separation of lower molecular weight hydrocarbons, and more particularly to an improved absorption separation process for the separation of a given hydrocarbon component from gaseous admixture thereof with both more and less volatile hydrocarbons.

It is conventional to separate a mixture of lower molecular weight hydrocarbons, such as a mixture of $C_1$-$C_4$ carbon-atoms-per-molecule hydrocarbons, including saturated and unsaturated hydrocarbons, into desired fractions by conventional fractional distillation processes by effecting the fractionation in a suitable fractionating column under sufficiently low temperatures and/or under superatmospheric pressures so as to obtain adequate rectification in the fractionator.

It is also known to effect separation of a mixture of gaseous hydrocarbons into at least two fractions by a process wherein the gaseous mixture is contacted with a counterflowing liquid absorbing medium or a "fluidized" solid adsorbent or it is passed through a stationary solid adsorbent mass with absorption or adsorption, respectively, of certain of the mixture components and separation thereof from the non-absorbed or nonadsorbed components. It is known, for example, to effect a partial separation of $C_1$ and $C_2$-hydrocarbons from admixture thereof with $C_3$, with or without higher hydrocarbons by countercurrently contacting the mixture with a hydrocarbon oil in proportions and under conditions to dissolve or absorb and remove at least substantially all of the $C_3$-hydrocarbons, and thus also the higher hydrocarbons, in the oil. The resulting raffinate of unabsorbed $C_1$ and $C_2$ hydrocarbons is used for many purposes, such as for fuel purposes, recycling to gas-distillate wells, and a source of ethylene and ethane for conversion into valuable chemicals such as ethanol, ethyl chloride, ethylene glycol, etc. However, in the use as a basic chemical for chemical synthesis, it is necessary to effect a separation of the $C_2$ hydrocarbons, particularly ethylene, from the methane, which separation requires additional operations, gas handling processes, equipment, and the like, all of which increase the cost of preparing the ethylene in a suitable concentration and purity.

It is an object, therefore, of this invention to provide an improved method for the separation and recovery of $C_2$-hydrocarbons from admixtures thereof with $C_1$ and $C_3$ hydrocarbons. A further object is to provide a method which effects more complete recovery of $C_2$ hydrocarbons from a mixture of $C_1$-$C_3$ hydrocarbons in a single contacting operation. Another object is to provide a process for the separation of $C_2$ hydrocarbons from gaseous admixture with $C_1$ and $C_3$ hydrocarbons and which process utilizes entropy change of mixing of an absorption oil with the $C_3$ hydrocarbons to effect stripping of dissolved $C_2$ hydrocarbons therefrom. A still further object is to provide an improved absorption process for the separation of a given hydrocarbon from admixture with hydrocarbons some of which are more readily and some less readily absorbed or dissolved in a given absorption medium than the given hydrocarbon. Other objects and advantages of the present invention will be evident from the following detailed desciption of the invention.

Now, in accordance with the present invention, an improved process has been provided for the separation of a given hydrocarbon from gaseous admixture thereof with hydrocarbons some of which are more readily and some less readily absorbed or dissolved in a given absorption medium than the given hydrocarbon, in which process the gaseous admixture is countercurrently contacted in a contacting zone with a given body of a fluid adsorption medium selected to effect only substantially complete absorption of said more readily absorbed hydrocarbon, and a gaseous fraction of unabsorbed material is withdrawn from the contacting zone at an intermediate point thereof which is substantially free of said more readily absorbed hydrocarbon and at which point withdrawal of a substantial fraction of the unabsorbed material in the gaseous state can be made and in which substantial fraction alone the content of said given hydrocarbon is substantially equivalent to, and the content of the less readily absorbed hydrocarbon is substantially less than, their contents, respectively, of the separated gaseous fraction if all of the unabsorbed gases were withdrawn at that point, i. e. of the original unabsorbed gas.

Described generally, the process, as applied to an exemplary mixture of three gaseous hydrocarbons A, B and C, where A, B and C, have similar physical properties which vary more or less progressively in degree, B having a given solubility relationship with respect to a hydrocarbon oil absorbent, A being relatively more readily absorbed or dissolved than B in said oil, and C being relatively less readily absorbed than B in said oil, comprises countercurrently contacting said mixture and a hydrocarbon oil absorbent therefor in a contacting zone while substantially continuously feeding a stream of said mixture and a stream of said absorbent to opposed ends, respectively, of the contacting zone, in relative proportions to ensure substantially complete absorption of component A in said absorbent within an A-absorption section (primary absorption or contacting zone) of said contacting zone, extending from the point of entry of said mixture to a section or point in the overall contacting zone intermediate said mixture and said absorbent feed points, and withdrawing from said contacting zone at a point substantially immediately outside said A-absorption section in the direction of flow of the gaseous mixture a substantial proportion of the unabsorbed gaseous mixture in an amount which has a content of B-component substantially equivalent to the total B-component content of the unabsorbed gaseous mixture at that point but with a substantially smaller content of C-component than the total C-component content of the unabsorbed gaseous mixture at that point, and passing the remaining unabsorbed gaseous mixture, through the remaining section (secondary absorption zone) of said contacting zone in countercurrent contact with said oil stream, whereby the B-component content of said remaining gaseous mixture is absorbed in said oil and returned therein to said A-absorption section wherein it is stripped from the oil by as yet unabsorbed A-component in a following portion of the gaseous mixture stream and thereby recovered to the withdrawal point of said B-component hydrocarbon.

Described more specifically, with reference to recovery of $C_2$-components from an exemplary gaseous mixture consisting essentially of methane, $C_2$-hydrocarbons (ethane and ethylene) and propane, using as absorbent, for example, a $C_5$–$C_7$ hydrocarbon oil, the process comprises passing the gaseous mixture upwardly in countercurrent contact with a downwardly flowing body of the absorption oil, the ratio of oil-to-gas rates and amounts being so selected, as determined by experiment or by calculation, based upon known factors such as rate of solution, etc., as to effect substantially complete removal of the propane from the gas stream in a lower section (propane absorption section) of the contacting zone, withdrawing a portion (usually a major portion but preferably not over about 80 per cent) of the unabsorbed gaseous mixture containing $C_1$ and $C_2$ hydrocarbons, and which is substantially free of propane, from the contacting zone substantially immediately above the propane-absorption zone to reduce the total volume of unabsorbed gases, which reduced volume then is countercurrently contacted with the absorption oil in an upper, B-absorption, section of the contacting zone, the reduced volume being selected to ensure substantially complete absorption of the $C_2$-content thereof in said absorption oil in said B-absorption section to return the B-content of the reduced volume of unabsorbed gases to the point of withdrawal of $C_2$-gases by way of a stripping action effected by as yet unabsorbed propane in the propane absorption zone, and finally withdrawing a substantial portion of the methane from the top of the contacting zone, the $C_2$-content of the gaseous mixture withdrawn from the intermediate section of the contacting zone being substantially all of the $C_2$-content of the original gaseous mixture.

The mixtures of substances to be separated by the present invention may be of various kinds, of more or less chemically and physically related substances, the only requirement being that the substances are vaporizable and that, what may be called an intermediate substance, or group of substances, is present with at least two other substances or groups of substances one of which is above and the other below the intermediate substance with respect to ease or rate of being dissolved in or absorbed by a common solvent for the three substances without permanent change of said substances. Thus, the invention may be applied to the separation of various mixtures of hydrocarbon substances which differ in solubilities in given common solvents therefor only to a relatively small extent. Of course, if the solubilities differ considerably, then separation is accomplished by well known simple processes of solvent extraction. Mixtures of other organic substances, such as mixtures of alcohols, of acids, of aldehydes, of ketones, of halogenated hydrocarbons, etc., which mixtures may be readily vaporized, may be separated by practice of the invention using various common solvents which normally, under the conditions of the process, exert only a physical or reversible chemical action on the substances. For example, as applied to the separation of a mixture of close boiling, volatile, chloroalkanes, and therefore a mixture which is difficultly separable by ordinary distillation, as common solvent to be used in the modified type of rectified absorption of this invention, there may be utilized a relatively higher boiling chloroalkane. Gaseous mixtures of two or more alkenes and alkadienes with at least one alkane or another alkene or alkadiene may be separated in accordance with the invention wherein the common solvent used for at least two of the substances may effect a reversible chemical combination therewith, such as an ammoniacal copper salt solution, or the like.

As already indicated, the solvent or absorption medium should be chemically inert toward the substances of the mixture to be separated or, as stated, should not react therewith except for the formation of reversible addition compounds. The ratio of solvent or absorption medium to gaseous mixture may vary over a considerable range just so long as the ratio is correlated to other variable factors, such as temperature, pressure, length of primary absorption zone, etc., to ensure substantially complete absorption only of the most readily absorbed substances in the absorption medium in the primary absorption zone. It will be understood that for a given mixture of substances to be treated, the ratio of solvent-to-mixture, to satisfy the above conditions, will depend on the nature of the particular solvent selected for the process.

The separation process of this invention may be practiced under various temperature and pressure conditions, the selected values of each being determined by each particular case. Thus, in the separation of $C_2$-hydrocarbons from admixture with methane and propane, utilizing a $C_5$–$C_7$ hydrocarbon oil as absorption medium, the process may be advantageously carried out at 80° F. and under a pressure of 300 pounds per square inch absolute (psia). With substances which are normally liquid, the process should be carried out at a temperature at which the mixture to be separated will be principally in the gaseous or vapor state, i. e., at a temperature above the bubble temperature of the mixture, which temperature, of course, will depend on the pressure in the system, which pressure may be atmospheric, subatmospheric or superatmospheric.

The method of practicing the invention will be more fully understood from the following description of exemplary embodiments thereof taken with reference to the accompanying drawing which is made a part of the specification wherein Fig. I is a schematic diagram showing an improved method for the recovery of $C_2$ hydrocarbons from a gaseous admixture thereof with $C_1$ and $C_3$ hydrocarbons, and Fig. II is a schematic diagram illustrating a multiple separation of a gaseous mixture containing at least four components for which separations one from the others is desired.

Referring to Fig. I, 11 represents a contacting column or tower, represented as a bubble-cap type of tower for purposes of illustration, provided with top and bottom outlet lines 12 and 14, respectively, upper and lower feed lines 15 and 16, respectively, a withdrawal line 17 intermediate the points of communication of the feed lines 15 and 16 with the column 11 and also positioned to withdraw gaseous material from between two consecutive plates in the column and positioned to divide the column 11 hypothetically into a lower or primary absorption or contacting zone and an upper or secondary contacting zone, and a suitable heating means 19 disposed in the lower part of the column.

In operation, a mixture of $C_1$, $C_2$ and $C_3$ hydrocarbons is delivered through line 16 to column 11 and a suitable liquid absorption oil, e. g. a mixture of $C_5$–$C_7$ hydrocarbons, is delivered thereto through line 15 and the $C_1$, $C_2$ and $C_3$ gaseous mixture is contacted as it flows upwardly through column 11 with the downwardly flowing absorption oil. The ratio of the rates of flow of the materials thus contacted in passing through the column is adjusted so that substantially all of the $C_3$-hydrocarbon component is absorbed in the absorption oil within the primary contacting zone below the exit of line 17. Thus, a flow control 20 in line 15 may be used to control valve 20 in line 16. Either the ratio of rates of flow of the materials is so adjusted and/or, if preferred or desirable, an amount of heat energy is supplied to the primary absorption zone by means of any suitable heating or reboiler means 19 to drive or strip from the absorption oil when it is in the primary absorption zone most all of any dissolved or absorbed $C_2$ hydrocarbons.

The fat oil containing the $C_3$-hydrocarbons as formed in the primary absorption zone is withdrawn from the bottom of column 11 through line 14, which is provided with control valve 22 which controls the rate of flow of oil therethrough, responsive to variations in the liquid level in the bottom of column 11, control being made by means of a liquid level control 24. A pump 25 in line 14 pumps the fat oil to an upper section of a stripping column 26 which is provided with a suitable heating means 27 in the bottom thereof. The fat oil is stripped in column 26 substantially free of the absorbed $C_3$ hydrocarbons which are discharged through valved line 29 and the resulting lean oil is returned by means of line 30, pump 31, control valve 32 and line 33 back to line 15 and therethrough to absorption column 11. Valve 32 is controlled by means of a liquid level responsive control device 34.

Substantially all of the $C_3$ hydrocarbon content of the gaseous feed stream having been absorbed in the absorption oil in the primary absorption zone below withdrawal line 17, the remaining unabsorbed portion of the gaseous mixture containing the $C_1$ and $C_2$ hydrocarbons thereof is now divided into two separate fractions, the one being withdrawn through valved line 17 and the other fraction being contacted in the secondary absorption zone above the withdrawal point of the line 17 with the fresh absorption oil. With the removal of a portion of the $C_1$–$C_2$ gaseous mixture through line 17, the rate of gas flow through the secondary absorption zone is materially reduced from what the rate would be without such withdrawal. By judiciously adjusting the proportion of the $C_1$–$C_2$ gaseous mixture withdrawn in line 17, the contacting conditions, particularly the relative rates of flow of gas and oil, in the secondary zone can be adjusted to insure substantially complete absorption in the oil of the $C_2$-content of said other fraction of gas passing into the secondary absorption zone. This absorbed $C_2$-content then is returned in the oil to the primary zone wherein it is stripped therefrom by some of the $C_3$-content of a following portion of the gas stream and thereby enriches the unabsorbed $C_1$–$C_2$ gas mixture. In this manner, it is seen that, in effect, the entropy change of mixing the oil and the $C_3$-hydrocarbons is utilized in effecting the separation of $C_1$ and $C_2$ hydrocarbons in the secondary absorption zone.

The unabsorbed gas content of the gas passed into the secondary absorption zone is discharged therefrom through line 12, the discharged gas being substantially $C_1$-hydrocarbons.

Thus, the $C_2$-containing gas withdrawn through line 17 is richer with respect to $C_2$-hydrocarbons by a value corresponding to the discharge of non-$C_2$ material in line 12, since, without such separation and discharge all of the $C_1$-hydrocarbons would be associated with the $C_2$ hydrocarbons in the withdrawn $C_2$-hydrocarbon stream. This decrease in the amount of $C_1$ in the $C_2$-stream materially reduces equipment requirements for further handling of the $C_2$-stream, the economies thus realized being obtained at the expense of otherwise lost entropy change resulting from the mixing (dissolving) of the $C_3$ in the oil.

It will be understood that the present invention as illustrated in Fig. I may be applied to the case where a multiplicity of separations is desired. Fig. II illustrates an application of the invention to separation of a wet hydrocarbon gas mixture into several concentrate fractions. Referring to Fig. II, a wet hydrocarbon gas feed as may be obtained from a wet gas well, or as products of various refinery operations and comprising $C_1$–$C_4$ hydrocarbons together with $N_2$ and/or $H_2$ is delivered through a line 41 to a lower part of a contacting column 42 wherein it is countercurrently contacted with a downwardly flowing body of a liquid hydrocarbon absorption oil fed to the column through a line 44. The rate of feeding the lean oil to the column is adjusted, in view of the composition of the feed, the nature of the feed oil, and the temperature and pressure maintained in the column, so that substantially all of the $C_3$ material will be absorbed by the oil while in the indicated $C_3$ absorption zone (primary), that is, at least by the time the $C_3$ material in the gas feed reaches the level of the gaseous take-off line 45. A substantial proportion of the gas at the level of take-off line 45 is withdrawn through line 45 as a $C_2$-concentrate, the proportion withdrawn being selected so that as the remaining gas contacts the oil in the $C_2$ or secondary absorption zone, on account of the reduced gas flow rate, substantially all of the $C_2$ content thereof is absorbed in the oil, thereby being returned to the $C_3$ absorption zone from which it is stripped by means of as yet unabsorbed $C_3$ therein. By this manner substantially all of the $C_2$ hydrocarbon content of the feed gas is separated in line 45, being mixed, of course, with some but not all of the lighter components. The same type of operation is repeated at the point in the column level with withdrawal line 46 and as correlated with absorption of $C_1$ in the $C_1$ or tertiary adsorption zone, returning it to the secondary absorption zone, displacing it therefrom by as yet unabsorbed $C_2$ material and thereby enriching the gaseous material immediately above the $C_2$ absorption zone with respect to $C_1$ material, a $C_1$ concentrate being withdrawn through line 46. The unabsorbed $N_2$ and/or $H_2$ is discharged through exit line 47. A suitable heating means 49 in the bottom of the column may be utilized to aid in the rectified absorption and/or to adjust the upper boundaries of the respective absorption zones, as will be readily understood. Also, auxiliary heating and/or cooling means may be provided in any or all of the separate contacting zones. Fat oil containing absorbed $C_3$ and heavier hydrocarbons is withdrawn through line 50.

As an illustration of the utility and advantage of separating a wet hydrocarbon mixture by practicing the present invention, when applying the invention to a separation as illustrated in Fig. II, an excess of about 40% of fractions lighter than ethylene can be rejected upwards through the column above the $C_2$ absorption zone with a corresponding enrichment in its $C_2$ content of the withdrawn $C_2$ concentrate stream by approximately 40% of its original concentration. Further, approximately 25% of the rejected light fraction can be still further treated to reject above the $C_1$ absorption zone the $N_2$ and/or $H_2$ content thereof, thus enriching the $C_1$ concentrate which is withdrawn through line 46.

To illustrate further the utility and advantages of the invention, there is given in the table comparative material balances resulting from treating a wet hydrocarbon gas feed of the nature described above with reference to Fig. II, in one case in a single contacting zone with absorption and separation only of the $C_3$ and heavier components of the gas feed, and in another case according to the practice of the invention as described with reference to Fig. II, except for the omission of the precontacting in $C_1$ absorption zone.

TABLE

*Material balance*

|  | Only $C_3$ Absorption Zone | $C_2$ and $C_3$ Absorption Zones |
|---|---|---|
| Methane rejected | None. 0% | 1.5 M²SCF/day. 35%. |
| Ethylene Loss | None | 1.5%. |
| Ethane Loss | do | 0.2%. |
| Gas Rate to Ethylene Recovery from Ethane. | 6.4 M²SCF/day | 4.9 M²SCF/day. |
| Composition of Gas to Ethylene Recovery. | Mol %<br>$C_1$ = 68<br>$C_2$ = 8.2<br>$C_2^=$ = 23.1<br>$C_3$ = 0.7<br>100.0 | Mol %<br>$C_1$ = 57.9<br>$C_2$ = 10.7<br>$C_2^=$ = 30.5<br>$C_3$ = 0.9<br>100.0 |

It is readily seen that since 68% of 6.4 (4.35) M²SCF/day is considerably more than 57.9% of 4.9 (2.84) M²SCF/day, then there is a reduction of about 1.52 M²SCF/day (about 25%) in the amount of methane that is carried to the ethylene-ethane fractionating equipment. Furthermore, in addition to representing a saving in subsequent separation, this reduction in volume represents a saving in pumping requirements, compressors, etc. It is also seen that the 4.9 M²SCF/day of gas having a $C_2$ content of 41.2% (2.02 M²SCF/day) contains substantially the same amount (2.00 M²SCF/day) as the 6.4 M²SCF/day of gas having a $C_2$ content of 31.3%.

Although the embodiments of the invention as represented by Figs. I and II are practiced in a single contacting column divided by the product withdrawal lines into two (Fig. I) and three (Fig. II) absorption zones, respectively, it will be understood that the different absorption zones may be within separate columns. Also, and particularly in the case of using separate columns for the different absorption zones, the columns may be of any of the usual types adapted for effecting intimate contacting between counterflowing gaseous material and an absorbent medium therefor. Thus, one or more of the columns may be simply packed columns and the various columns may be of different types.

I claim as my invention:

1. A process for separating a gaseous mixture consisting essentially of $C_1$, $C_2$ and $C_3$ hydrocarbons, comprising the steps of: passing said gaseous mixture in counterflowing contact with a liquid hydrocarbon absorption oil for said hydrocarbons in a primary contacting zone to absorb thereby a major proportion of said $C_3$ hydrocarbons and to strip from said absorption oil the $C_2$ hydrocarbons absorbed thereby in a previous contacting step as described below; separating the resulting fat absorption oil from primary unabsorbed gases; passing a portion from about 20% to about 50% of said separated unabsorbed gases into counterflowing contact with a lean absorption oil in a secondary contacting zone to absorb thereby the $C_2$ hydrocarbons from said portion of unabsorbed gases to produce the absorption oil for the primary contacting zone; separating the resulting absorption oil with the $C_2$ hydrocarbons thus absorbed thereby from secondary unabsorbed gases; and passing the absorption oil containing absorbed $C_2$ hydrocarbons from said secondary contacting zone into said primary contacting zone for contacting a further portion of said gaseous mixture the flow of absorbent passed through said zones being selected to be approximately the minimum amount required to absorb all of the $C_3$-hydrocarbons from the gaseous mixture in the primary zone and the portion of unabsorbed gases passing to the secondary zone being selected to contain approximately the maximum content of $C_2$-hydrocarbons which may be absorbed therefrom by the absorbent flowing through the secondary zone.

2. A process for separating a gaseous mixture consisting essentially of $C_1$, $C_2$ and $C_3$ hydrocarbons, comprising the steps of: passing said gaseous mixture in counterflowing contact with a liquid hydrocarbon absorption oil in a primary contacting zone to absorb therein substantially all of said $C_3$ hydrocarbons and to strip from said absorption oil the $C_2$ hydrocarbons absorbed therein in a previous contacting step as described below; separating the resulting fat absorption oil from primary unabsorbed gases; passing a minor but substantial portion of said separated unabsorbed gases into counterflowing contact with a lean liquid hydrocarbon absorption oil in a secondary contacting zone to absorb therein the $C_2$ hydrocarbons from said minor portion of unabsorbed gases to produce the absorption oil for the primary contacting zone; separating the resulting absorption oil with the $C_2$ hydrocarbons thus absorbed therein from secondary unabsorbed gases; and passing the absorption oil containing absorbed $C_2$ hydrocarbons from said secondary contacting zone into said primary contacting zone for contacting a further portion of said gaseous mixture.

3. A process for separating a vaporizable mixture of hydrocarbons consisting essentially of components A, B and C which decrease in the order named in their readiness for being absorbed by a common liquid hydrocarbon absorption oil, which process comprises the steps of: passing a mixture of said A, B and C hydrocarbons in the vapor state in counterflowing contact with a liquid hydrocarbon absorption oil therefor in a primary contacting zone to absorb therein substantially all of said A hydrocarbons and to strip from said absorption oil B hydrocarbons absorbed thereby in a previous contacting step as described below; separating the resulting fat absorption oil from the primary unabsorbed vapor; passing a minor but substantial portion of said separated vapor into counterflowing contact with a lean absorption oil in a secondary contacting zone to absorb thereby the B hydrocarbons in said minor portion of unabsorbed vapor to produce the absorption oil for the primary contacting zone; separating the resulting absorption oil with the B hydrocarbons thus absorbed thereby from the secondary unabsorbed vapor; and passing the absorption oil containing absorbed B hydrocarbons from said secondary contacting zone into said primary contacting zone for contacting a further portion of said vapor mixture of A, B and C hydrocarbons.

4. A process for separating a gaseous mixture consisting essentially of A, B and C hydrocarbons which decrease in the order named in their readiness for being absorbed by a common liquid hydrocarbon absorption oil therefor, which process comprises the steps of: contacting a gaseous stream of said A, B and C hydrocarbons successively in a first and a second contacting zone with a counterflowing stream of a liquid hydrocarbon absorption oil therefor; separating from the first contacting zone a fat absorption oil which contains substantially all of said A hydrocarbons and a primary unabsorbed gas stream which contains substantially all of said B and C hydrocarbons; separating the primary unabsorbed gas stream into a minor portion containing from about 20% to about 50% of said primary unabsorbed gas stream and a major portion of from about 50% to about 80% of said primary unabsorbed gas stream, the major portion of which is withdrawn as B hydrocarbon-containing product and the minor portion of which is passed to the second contacting zone; separating from the second contacting zone said absorption oil enriched in said B hydrocarbons and a secondary unabsorbed gas stream which is substantially free of B hydrocarbons and contains the C hydrocarbons from said minor portion of said primary unabsorbed gas stream; and passing said absorption oil enriched in B hydrocarbons to said first contacting zone.

5. A process for the separation of a mixture of a plurality of hydrocarbons A, B, C and D which decrease in the order named in their readiness for being absorbed by a common liquid hydrocarbon absorption oil, comprising the steps of: contacting a gaseous stream of said A, B, C and D hydrocarbons successively in a series of first, second and third contacting zones with a counterflowing stream of a liquid hydrocarbon absorption oil therfor; separating from the first contacting zone a fat absorption oil which contains substantially all of said A hydrocarbons and a primary unabsorbed gas stream which contains substantially all of said B, C and D hydrocarbons; separating the primary unabsorbed gas stream into minor and major portions, the major portion of which is withdrawn as B hydrocarbon-containing product and the minor portion of which is passed to the second contacting zone; separating from the second contacting zone said absorbent enriched in said B hydrocarbons and a secondary unabsorbed gas stream which is substantially free of B hydrocarbons and contains the C and D hydrocarbons from said minor portion of said primary unabsorbed gas stream; passing said absorption oil enriched in B hydrocarbons to said first contacting zone; separating the secondary unabsorbed gas stream into minor and major portions, the major portion of which is withdrawn as C hydrocarbon-containing product and the minor portion of which is passed to the third contacting zone; separating from the third contacting zone said absorption oil enriched in said C hydrocarbons and a tertiary unabsorbed gas stream which is substantially free of C hydrocarbons and contains the D hydrocarbons from said minor portion of said secondary unabsorbed gas stream; and passing said absorption oil enriched in C hydrocarbons to said second contacting zone.

6. A process for separating a vaporizable mixture consisting essentially of chemically related organic compounds A, B and C which decrease in the order named in their readiness for being reversibly absorbed by a common liquid absorption medium therefor, which process comprises the steps of: passing said mixture in the vapor state in counterflowing contact with said liquid absorption medium for said compounds A, B and C in a primary contacting zone to absorb thereby a major proportion of said A compounds and to strip from said liquid absorption medium the B compounds absorbed thereby in a previous contacting step as described below; separating the resulting fat absorption medium from primary unabsorbed gases; passing a portion of from about 20% to about 50% of said separated unabsorbed gases into counterflowing contact with a lean absorption medium of said liquid absorption medium in a secondary contacting zone to absorb thereby the B compounds from said portion of unabsorbed gases to produce the absorption medium with the B compounds thus absorbed thereby from secondary unabsorbed gases; and passing the liquid absorption medium containing absorbed B compounds from said secondary contacting zone into said primary contacting zone for contacting a further portion of said gaseous mixture.

7. A process for separating a gaseous mixture consisting essentially of $C_1$, $C_2$ and $C_3$ hydrocarbons, comprising the steps of: passing said gaseous mixture through a primary contacting zone in counter-flowing contact with a hydrocarbon absorption oil for said hydrocarbons and containing as absorbate a substantial portion of $C_2$ hydrocarbons derived as described hereinafter, in relative contacting proportions selected to absorb substantially all of the $C_3$-hydrocarbon content of said mixture and not more than a minor content of lower molecular weight hydrocarbons in said oil whereby substantially all of the $C_3$-hydrocarbon content is removed from said primary zone as absorbate with said oil and the $C_1$- and $C_2$-hydrocarbon content of said mixture and said $C_2$ absorbate is removed from the primary zone as unabsorbed gaseous mixture; dividing said unabsorbed gaseous mixture into a product portion and into a second gaseous portion, which second portion is selected to contain substantially the maximum $C_2$-hydrocarbon content which is removable therefrom by counterflowing contact with the fresh absorption oil recoverable from the oil containing $C_3$-hydrocarbon absorbate removed from the primary zone; countercurrently contacting said second gaseous portion in a second contacting zone with fresh absorption oil in amount corresponding to the amount of oil passing through said primary zone, whereby the $C_2$-hydrocarbon content of said second portion is removed as absorbate with said absorption oil from said second contacting zone; and utilizing said absorption oil containing said $C_2$-hydrocarbon absorbate as the absorption oil in said primary contacting zone.

8. A process for separating a wet hydrocarbon gaseous mixture comprising $C_1$–$C_4$ hydrocarbons and containing $C_1$ and $C_2$ hydrocarbons in a mol ratio of approximately two to one of $C_1/C_2$, comprising the steps of: passing said gaseous mixture through a primary contacting zone in counterflowing contact with a hydrocarbon absorption oil for said hydrocarbons and containing as absorbate therein a substantial portion of $C_2$-hydrocarbons derived as described hereinafter, in relative contacting proportions selected to absorb substantially all of the $C_3$- and higher hydrocarbon content of said mixture and not more than a minor content of lower molecular weight hydrocarbons in said oil, whereby substantially all of the $C_3$- and higher hydrocarbon content is removed from said primary zone as absorbate with said absorption oil and the $C_1$ and $C_2$ hydrocarbon content of said mixture and said $C_2$ absorbate is removed from the primary zone as unabsorbed gaseous mixture; dividing said unabsorbed gaseous mixture into a major product portion and into a second gaseous portion, which second portion is selected to contain approximately 35% of the $C_1$- and of the $C_2$-hydrocarbon content of said unabsorbed gaseous mixture; countercurrently contacting said second gaseous portion in a second cointacting zone with approximately the minimum proportion of fresh absorption oil to absorb substantially all of the $C_2$-hydrocarbon content from said second gaseous portion, whereby the $C_2$-hydrocarbon content thereof is removed as absorbate with said oil from said second contacting zone; and utilizing said oil containing said $C_2$-hydrocarbon absorbate as the absorption oil in said primary contacting zone.

9. A process for separating a gaseous mixture consisting essentially of substances A, B and C which decrease in the order named in their readiness for being reversibly absorbed by a common liquid absorption medium therefor and which are relatively inert toward each other under the conditions of the process, which process comprises the steps of: passing said mixture in the gaseous state in counterflowing contact with said liquid absorption medium for said substances A, B and C in a primary contacting zone to absorb thereby a major proportion of said A substance and to strip from said liquid absorption medium the portion B substance absorbed thereby in a previous contacting step as described below; separating the resulting fat absorption medium from primary unabsorbed gases; passing a portion of from about 20% to about 50% of said separated unabsorbed gases into counterflowing contact with a lean absorption medium of said liquid absorption medium in a secondary contacting zone to absorb thereby the B substance from said portion of unabsorbed gases to produce the absorption medium with the B substance thus absorbed thereby from secondary unabsorbed gases; and passing the liquid absorption medium containing absorbed B substance from said secondary contacting zone into said primary contacting zone for contacting a further portion of said gaseous mixture.

PHILIP H. DEMING.

REFERENCES CITED

The following references are of record in the file of this patent:

UNITED STATES PATENTS

| Number | Name | Date |
|---|---|---|
| 1,422,007 | Soddy | July 4, 1922 |
| 2,038,314 | Ragatz | Apr. 21, 1936 |
| 2,160,163 | Nichols | May 30, 1939 |
| 2,270,903 | Rudbach | Jan. 27, 1942 |
| 2,318,752 | Carney | May 11, 1943 |
| 2,335,009 | Holloway | Nov. 23, 1943 |
| 2,495,842 | Gilliland | Jan. 31, 1950 |